United States Patent [19]
Padovani

[11] 3,825,166
[45] July 23, 1974

[54] CONTAINER HAVING AN OPEN TOP SURROUNDED BY A LIP

[75] Inventor: Pietro Padovani, Verona, Italy

[73] Assignee: O.M.V. S.p.A., Parona, Verona, Italy

[22] Filed: Feb. 7, 1972

[21] Appl. No.: 223,945

[30] Foreign Application Priority Data
Feb. 13, 1971 Italy .................................. 84912/71

[52] U.S. Cl. .............................................. 229/1.5 B
[51] Int. Cl. ............................................ B65d 3/00
[58] Field of Search ..................... 229/1.5 B; 220/74

[56] References Cited
UNITED STATES PATENTS
2,988,258   6/1961   Witzke ................................. 220/74
3,169,688   2/1965   Schad ............................... 229/1.5 B
3,190,530   6/1965   Edwards ........................... 229/1.5 B
3,414,180   12/1968  Tigner .............................. 229/1.5 B Primary Examiner—George T. Hall
Attorney, Agent, or Firm—Steinberg & Blake

[57]  ABSTRACT

A rotationally symmetrical container which is open at its top and which is made of a thermoplastic sheet material of a given thickness. The container has a constant wall thickness and carries an outwardly and downwardly extending lip at the upper end surrounding and spaced from an upper wall region of the container and defining a continuous uninterrupted groove therewith. This lip has a solid cross section the thickness of which is greater than the thickness of the sheet used for production of the container.

1 Claim, 12 Drawing Figures

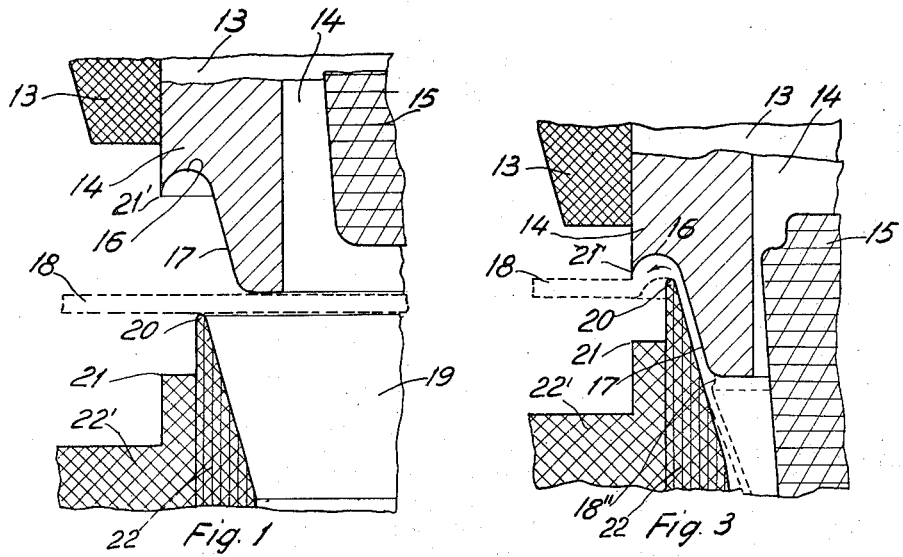
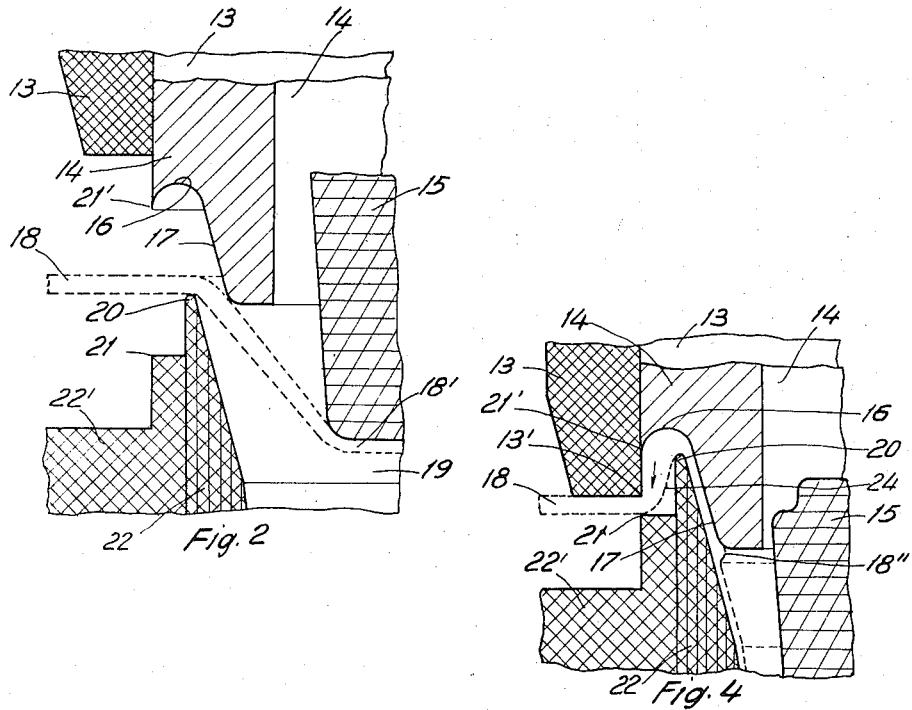

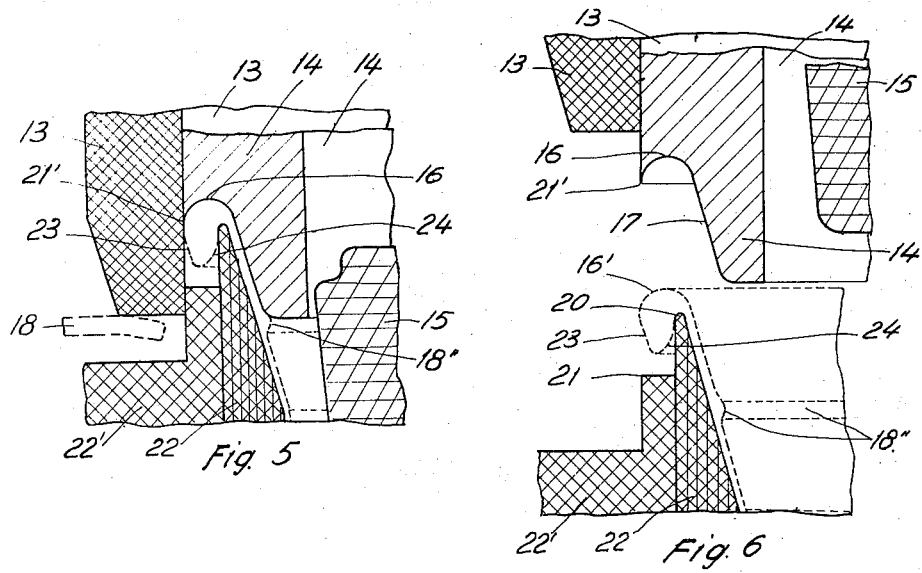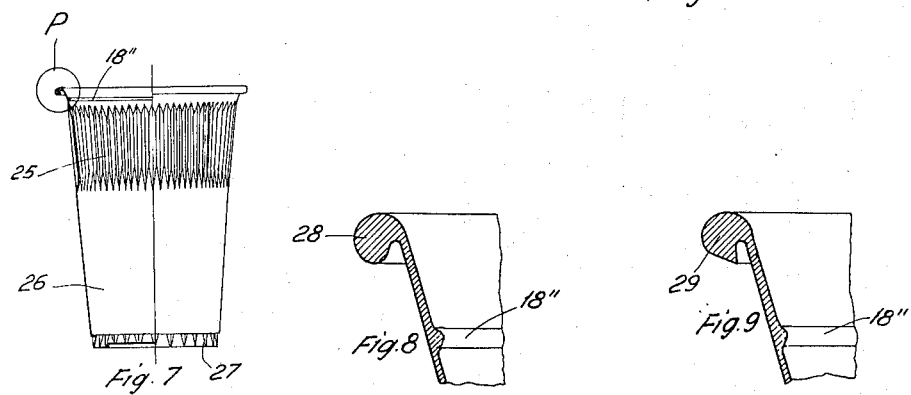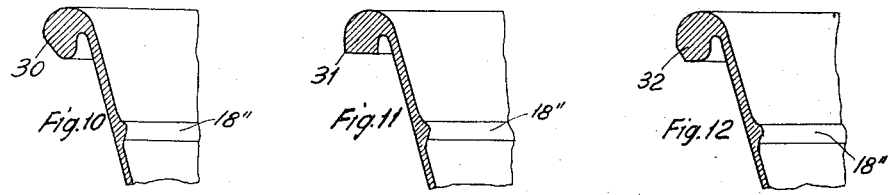

CONTAINER HAVING AN OPEN TOP SURROUNDED BY A LIP

The present invention relates to an encircling torus or lip on the edge of an open-topped container made from a thermoplastic foil or sheet.

Containers made from sheets and having flanged-over edges are known; the edges serving to stiffen the container against lateral compressive stresses. The thickness of these flanged-over edges is normally equal to the thickness of the foil used to produce the container. Consequently, the reinforcing of the cup edge against lateral compressive stresses is not very great and the flanged-over edges often fracture when such stresses are exerted thereon.

The present invention is to be used at an edge torus or lip on such a container, and more particularly on an inverted frusto-conical cup or the like of thermoplastic material, and to provide an edge which will withstand considerably greater compressive stresses than known flanged-over edges. This object is attained in accordance with the invention in that during moulding of the container, pressure is exerted on both sides of the upper edge region of the container, that yielding of thermoplastic material squeezed-out thereby in an upward and in radially outward direction is prevented to thus form a thickening of the foil, and that the foil at the edge of the thickening is drawn downwards subject to elongation and subsequently severed at this point.

By accumulating the squeezed-out material at the upper edge of the container, a thickening is at first produced in the still plasticized state of the material, and is subsequently elongated and, in the elongated state, is severed from the remainder of the sheet. Due to the partial cooling-off occurring in the meantime, the natural resilience or elasticity of the thickening becomes so considerable that it contracts to form a lip extending outwardly and downwardly having a solid cross-section; the thickness of which section is greater than the thickness of the sheet used for the production.

The invention is favourably and particularly useful in a container in the form of an inverted frusto-conical cup or beaker having inclined walls of preferably constant thickness. Such a cup is substantially more stable whilst at the same time simpler and cheaper to produce than known cups or containers with flanged over edges in the form of flat or arcuate flanges. By squeezing-out the material into the thickening which forms the lip, the expenditure in material is substantially no greater than in known edge arrangements. The known flanged-over edges are mostly moulded-on after producing the container itself. This additional operation is omitted with the invention, since the lip may be moulded on directly during production of the cup of the thermoplastics foil.

The downward facing side of the lip which is formed after severing the foil from the thickening and whilst it is still in a readily plasticized state, may be upset thereon by a suitable tool of optional shape. This shaping may further increase the rigidity of the lip.

The container itself is formed in known manner by deep-drawing the clamped foil or sheet in a matrix mould and subsequently applying excess or negative pressure to intimately mould the sheet, plasticized by heat, against the matrix.

To provide the moulded on lip with an expedient shape, the section of the outer surface preferably located between the cutting opening and above the normally stationary cutter extending substantially in an axial direction of the lower mould part, may form a chamber in the position at which the stationary cutter and the upper mould part are at their closest proximity to each other; the dimension of the chamber is a radial direction being greater than the thickness of the sheet. This expedient shaping of the cutting opening and the chamber located behind it, firstly enables the production of a thickening of the thermoplastic material squeezed-out between the mould sections, and secondly permits elongation of this thickening within the chamber due to moving the displaceable cutter downwards until the cutting edges of both cutters sever the remainder of the foil adjacent to the thickening. Thus, only the outer and upper surface of the thickening comes into contact with a tool whilst the inner and lower surface of the thickening, owing to the section of the outer surface of the lower mould section extending in an axial direction, does not come into contact with any of the moulding tools. After severing therefore the thickening due to its inner elasticity, tends to be as flatly defined as possible within the surface which has come into contact with displaceable cutter, whilst the surface parts which do not come into contact with any tool at all, tend to contract into a substantially circular cross-section.

The final shape of the lip, however, if required, can also be influenced in the still plasticized state by a suitable upsetting tool, whereby the normally stationary cutter preferably at the outer surface of the lower mould section, is axially displaceable after severing the foil, and the upper surface adjacent to the cutting edge is formed as an upsetting tool of optional shape particularly suitable for the given shape of the cup. The normally stationary cutter in this embodiment, and during the moulding of the lip is actually stationary but may subsequently be axially displaced.

For further reinforcement of the edge of the container or cup in accordance with a further proposal of the invention, the surface of the upper mould section abutting on the inside surface of the upper wall region of the cup may be bent inwards at the lower end of this wall region. This also causes some foil material to be squeezed-out downwardly, so that an annular thickening is produced at a lower end portion of the upper wall region of the container or cup carrying the lip. This thickening also contributes to the reinforcing against pressure stresses.

The invention will be described further, by way of example, with reference to the accompanying drawings, in which:

FIGS. 1 to 6 are partial axial sections through moulding apparatus sections required for the container of the invention and shown during successive steps of the method;

FIG. 7 is an axial section in the left-hand half thereof and a side view in the right-hand half thereof, of a cup having a lip moulded thereon; and FIGS. 8 to 12 are enlarged partial sections through upper wall regions of cups made of thermoplastic sheets showing various embodiments of the moulded-on lip.

Identical or corresponding parts are provided with identical reference numerals in the drawings. FIG. 1 shows a level foil or sheet 18 of thermoplastic material which has been brought to the temperature necessary for moulding a container and has been subsequently passed between a lower mould part 22, a tension or clamping element 15, an upper mould part 14 and a cutter 13, without making contact with these parts. As known from conventional moulding methods, the clamping element 15 elongates the material and, as shown at position 18', causes it to become thin-walled in the direction towards the base (not shown) of the cavity 19 of the lower mould part 22.

The upper mould part 14 is lowered, at an expediently selected speed in the direction towards the lower mould part 22 until, by means of its conical surface 17, it presses the material against the tapering wall of the upper part of the cavity 19 (FIG. 3). The pressure exerted by the surface 17 causes a proportion of the material of the sheet to flow out over the upper edge 20 of the lower mould part in the direction of the arrow to the point where the annular recess 16 conducts the material from the mould part 14 into the region at which the lips is formed and which is located between the edge 20 of the mould part 22 and the outer edge or rim 21' of the mould part 14 with a resultant thickening of the sheet in this region. At the same time, the upper mould part causes a cooling of the material with its conical surface 17 and prevents the material from being further stretched; an annular thickening 18" (FIG. 3) being formed which constitutes a particular bracing against stresses acting in a radial direction of the side walls of the container. There subsequently occurs an elongation and cutting-off of the edge and this may occur before the time at which excess or negative pressure is produced in the interior of the cavity 19 to cause the foil to abut against the side wall and base of the mould. The cutter 13 with the cutting edge 13' exerts a tractive action in the direction of the arrow in FIG. 4 which is rendered possible by the height of the cutting opening (21, 21') which in any case exceeds the thickness of the sheet 18.

As shown in FIG. 4, the inside surface 24 of the thickened portion which later forms the inside surface of the lip, does not come into contact with the metal parts.

The cutter 13 continues its movement until, together with the fixed cutter 22' having a cutting edge 21, it causes the separation of the container from the remaining or surplus sheet, and the lower part of the thckening (FIG. 5) whereupon the thickened portion is no longer subject to an elongating effect and contracts and moves upwards to form the required lip.

It is to be noted that the outer surface 23 of the thickening which, even only for a short period, has come into contact with the cutter 13 tends to maintain a straight line profile, whilst the inside surface 24 which has not come into contact with the metal parts, permits unobstructed contraction of the material. The material therefore tends to form a torus or lip, assumes a curved shape on the inside surface of the lip and at the same time exerts a tractive or pulling effect on the region of the lower apex of the lip.

The container may be ejected from the mould as soon as the clamping element 15 of the upper mould part 14 and the cutter 13 are raised.

For better understanding of FIGS. 1 to 6, FIG. 7 shows a completed container in the form of a cup with side wall 26, a ribbing 27 for bracing the base portion and special grooves 25 to reinforce the upper part, which towards the top has a predetermined slope or bevelling and a lip of full or solid cross-section, which are substantially indentical with the corresponding parts in FIG. 6. The portion enclosed by the circle P is reproduced in various alternative embodiments in FIG. 8 to 12, the development of the edges or rims 28, 29, 30, 31, 32 apparently depending directly upon the given shape of the cutters 22' used as the upsetting tool, the different shapes of which not being shown in the drawings but are conversant to the expert, since they may be readily derived from the final shape of the lip.

I claim:

1. A rotationally symmetrical container, having body portions, an opening at its top and made from thermoplastics material sheet of a given thickness, characterized by the feature that the upper wall region thereof has a constant wall thickness and carries an outwardly and downwardly extending lip at the upper end surrounding and spaced from said upper wall region and defining a continuous uninterrupted groove therewith, said lip having a solid cross-section the thickness of which is greater than the thickness of the sheet used for production of the container, said container being formed as an inverted frusto-conical cup with slanted walls and having an annular thickening in a lower portion of the upper wall region supporting the lip.

* * * * *